INVENTOR.
Jürgen Lambrecht
BY
Michael J. Striker
Atty

United States Patent Office 3,363,861
Patented Jan. 16, 1968

3,363,861
ROCKET PROPELLED WINGED AIRCRAFT
Jürgen Lambrecht, Munich, Germany, assignor to Junkers Flugzeug- und Motorenwerke A.G., Stuttgart-Zuffenhausen, Germany
Filed Dec. 9, 1964, Ser. No. 417,000
Claims priority, application Germany, Dec. 11, 1963, J 24,901
8 Claims. (Cl. 244—74)

The present invention relates to a rocket propelled winged aircraft, and more particularly to an aircraft of the general type disclosed in the copending application entitled, "Rocket Propelled Craft," Ser. No. 412,870, filed by Eugen Sanger on Nov. 19, 1964.

The copending application describes an aircraft which is propelled by rockets whose fuel is a mixture of liquid oxygen and hydrocarbon in a preferably stoichiometric ratio. When such a fuel mixture is burned, 10% of the gaseous combustion mass is unburned hydrogen. Air is added to the reaction mass to completely burn the excess of unburned fuel contained in the reaction mass.

The air flowing along the aircraft is added to the partly burned reaction mass under pressure. In some embodiments of the above mentioned application, a tubular mixing chamber is provided in which the combustion gases mix with air rammed into the tubular combustion chamber during flight of the aircraft.

In the embodiment of FIG. 5 of the above mentioned copending application and in the aircraft of the present invention, the mixing chamber is not bounded on all sides by walls, but is partly formed by a tapered portion of the aircraft body.

When the aircraft moves at very high hypersonic speed, the relative speed of the air flowing along the same is correspondingly high, and under such flow conditions, particular effects take place. The pressure equalization in a direction transverse to the flow direction of the air, is substantially reduced. Due to the phenomenon, it is possible to omit complete walls around the path of the air flowing along the aircraft. The pressure of air flowing along the tapered and reduced portion of the aircraft body is increased, by afterburning of the unburned fuel with oxygen of the air and the partly burned reaction mass of the rockets is completely mixed in the respective high pressure region with air and completely burned by the oxygen contained therein. While the thrust increase produced in this manner is less than in embodiments where the mixing chamber is closed by lateral walls on all sides, the outer tubular wall of the mixing chamber can be omitted so that the mass and weight of the aircraft is reduced, permitting corresponding increase of the weight and mass of the payload.

It is the object of the present invention to improve the aircraft disclosed in the above mentioned copending application, and provide an aircraft with a partly open mixing chamber for the complete combustion of the partly burned reaction mass with the oxygen of the air flowing at hypersonic speed along the aircraft.

Another object of the present invention is to form a mixing chamber by using portions of the aircraft body, and portions of the wings or fins of the aircraft.

Another object of the invention is to mount wings on an aircraft body in such a position that wings and corresponding portions of the body form a region of the aircraft which is suitable for the complete burning of a partly burned reaction mass.

With these objects in view, the rockets are placed in the aircraft of the invention in a position below the wing structure of the aircraft, and laterally of the aircraft body, and the wings are extended toward the rear of the aircraft body so as to form with the same a mixing chamber which is bounded on one side by a portion of the aircraft body, and on top by the wing structure. The respective portion of the body is shaped in such a manner that the pressure of the air flowing along the same and below the wing structure at hypersonic speed is increased when afterburning takes place with the mixing of the partly burned reaction mass with the flowing air.

Since each mixing area is bounded on one side and on top, the flowing air is better confined than in the embodiment of the above mentioned application where only a tapered body portion is used for increasing the pressure. Therefore, the construction of the present invention works more efficiently.

On the other hand, the tubular additional structure or wing means required by other embodiments of the above mentioned application, can be omitted in the present invention so that weight and mass of the aircraft can be reduced.

By using the indispensable body and wing structure for forming the mixing areas in which the pressure of the flowing air is increased, the present invention provides a more efficient and improved aircraft for completely burning the partly burned reaction mass of a liquid propellant mixture.

The novel features which are considered as characteristic for the invention are set forth in particular in the appended claims. The invention itself, however, both as to its construction and its method of operation, together with additional objects and advantages thereof, will be best understood fom the following description of specific embodiments when read in connection with the accompanying drawings, in which:

Figure 2:
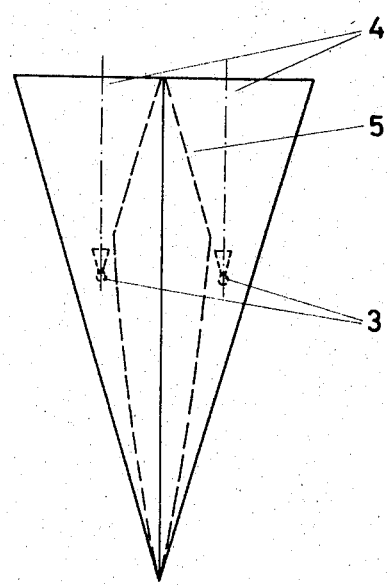
FIG. 2 is a plan view of the aircraft shown in FIG. 1.

Referring now to the drawings, the wing structure 1 is mounted on a body 2 to extend on top of the body. Rocket casing means 3 are mounted by brackets on the sides of body 2. As best seen in FIG. 2, the wing structure 1 is triangular, and extends from the front end to the rear end of body 2. Body 2 has a tapered rear portion with an inclined annular conical surface 5. The rocket casings 3 are mounted slightly forwardly of the tapered rear end portion 5.

The rocket casings contain a liquid propellant, for example a mixture of liquid oxygen and liquid hydrogen so that a reaction mass of which part is unburned hydrogen is emitted from the rear end of the rocket casings 3 in streams following partly the tapered surface of rear end portion 5 of the body, and partly the bottom surface of wing structure 1.

During flight of the aircraft through the atmosphere at supersonic speed, air flows along the aircraft body and under the wing structure 1 so as to be admixed to the partly burned reaction mass emitted by the rockets whereby the oxygen of the air effects complete combustion of the unburned hydrogen in the regions 4 where the pressure is increased due to the mixing process at the tapered rear end portion 5.

During the complete combustion, the pressure is further increased, which does not only increase the rearward thrust of the rockets, but also acts on the wing structure to lift the same and thereby the aircraft.

Figure 1:
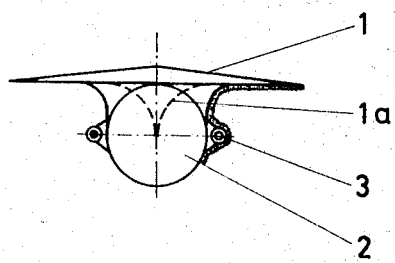
FIG. 1 is a schematic front view illustrating an aircraft in accordance with one embodiment of the invention.

While the wing structure 1 is shown on top of the body, it can be mounted closer to the rocket casings 3 in a lower position, and the rocket casings 3 may be suspended from the wing structure. As shown in FIG. 1, curved walls 1a are provided which extend from the lower surface of the wing structure to the tapered portion of the aircraft body to form a curved surface bounding the mixing spaces 4 by a surface extending through substantially 90°.

It will be understood that each of the elements described above, or two or more together, may also find a useful application in other types of rocket propelled aircrafts differing from the types described above.

While the invention has been illustrated and described as embodied in an aircraft provided with rockets in the region below the wing structure and effecting complete combustion of a liquid propellant by the oxygen of air flowing under the wing structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rocket propelled aircraft, comprising, in combination, an elongated body including a tapered rear end portion having a surface inclined to the longitudinal axis of said body; wing means mounted on said body and having a rear wing portion located above said tapered rear end portion; rocket casing means located laterally of said body spaced from the same, and; below said wing means spaced from the same; and a combustible propellant composition located in said rocket casing means and including a combustible fuel and a combustion supporting agent in such a ratio that said fuel is only partly burned with said agent so that a main thrust stream containing partly burned fuel is emitted from said rocket casing means into the region laterally of said inclined surface of said body under said rear wing portion and is there mixed with air flowing at supersonic speed so that the partly burned fuel is completely burned and produces an additional thrust acting on said inclined surface to forwardly propel the aircraft, and acting on said rear wing portion to produce an additional lifting force on said wing means.

2. Rocket propelled aircraft according to claim 1 wherein said rocket casing means are located forwardly of said rear end portion.

3. Rocket propelled aircraft according to claim 1 wherein said wing means is a triangular wing mounted on the top of said body, and having a pointed forward end and a rear end bounded by a transverse edge located at the rear end of said body.

4. Rocket propelled aircraft according to claim 1 wherein said body is a fuselage having a forwardly tapered front end portion; and wherein said rocket casing means are located adjacent said front end portion.

5. Rocket propelled aircraft according to claim 1 wherein said wing means includes wing parts located on opposite sides of said body; and wherein said rocket casing means include two rocket casings respectively located under said wing parts forwardly of said tapered rear end portion.

6. Rocket propelled aircraft according to claim 1 wherein said rear wing portion has a bottom surface located above said body; and wherein said tapered rear end portion has rounded lateral surfaces merging into the bottom surface of said rear wing portion.

7. A rocket propelled aircraft comprising, in combination, an elongated fuselage including a tapered rear end portion having a surface inclined to the longitudinal axis of the fuselage; wing means mounted on said fuselage and having lateral parts disposed on opposite sides of said fuselage, said lateral parts having rear end portions located above said tapered rear end portion of said fuselage; two rocket casings respectively located under said wing parts spaced from the same, and forwardly of said tapered rear end portion of said fuselage laterally spaced from the same; and a combustible propellant composition located in said rocket casings and including a combustible fuel and a combustion supporting agent in such a ratio that said fuel is only partly burned with said agent so that a main thrust stream containing partly burned fuel is emitted from each rocket casing into the region laterally of the inclined lateral surface portion of said tapered rear end portion of said fuselage under said rear end portions and is there mixed with air flowing at supersonic speed so that the partly burned fuel is completely burned and produces additional thrusts acting on said inclined surfaces to forwardly propel the aircraft, and acting on said rear wing portions to produce an additional lifting force on said wing means.

8. Rocket propelled aircraft according to claim 7 wherein said wing means is a triangular wing having a pointed forward end and a rear end bounded by a transverse edge located at the rear end of said fuselage; wherein said rear wing portions have bottom surfaces; and wherein said tapered rear end portion has rounded lateral surfaces merging into said bottom surfaces of said rear wing portions.

References Cited

UNITED STATES PATENTS

| | | | |
|---|---|---|---|
| 2,799,987 | 7/1957 | Chandler | 60—35.6 |
| 2,926,613 | 3/1960 | Fox | 60—35.6 |
| 3,074,668 | 1/1963 | Frenzl | 244—53 |
| 3,008,669 | 11/1961 | Tanczos et al. | 244—15 |

MILTON BUCHLER, *Primary Examiner.*

B. BELKIN, *Assistant Examiner.*